W. F. MISEGADIS.
CISTERN.
APPLICATION FILED JULY 23, 1920.
1,389,151.  Patented Aug. 30, 1921.
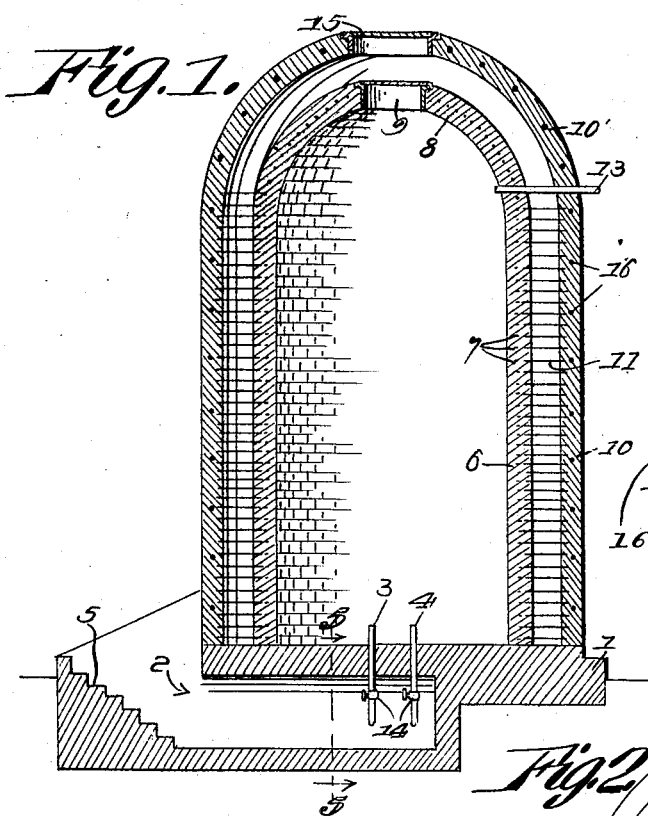
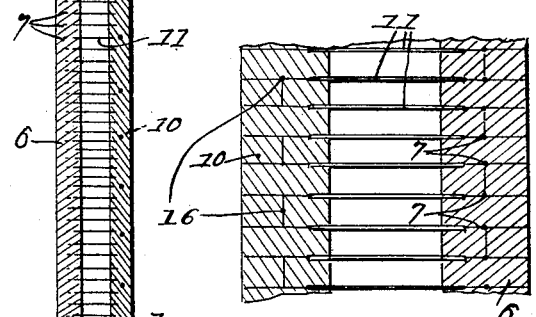
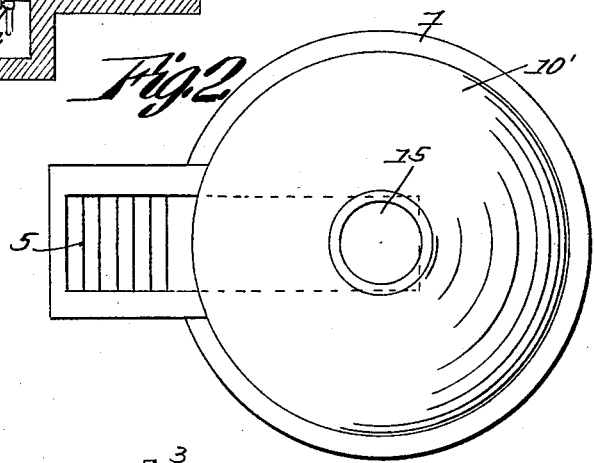
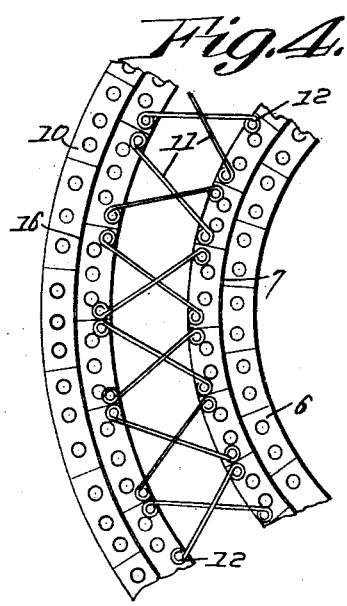
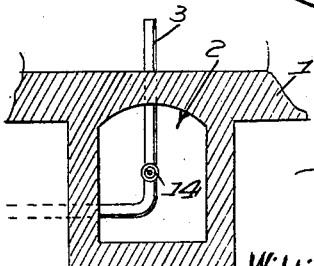
Inventor
William F. Misegadis,
By
William C. Linton.
Attorney

UNITED STATES PATENT OFFICE.

WILLIAM F. MISEGADIS, OF LORTON, NEBRASKA.

CISTERN.

1,389,151.   Specification of Letters Patent.   Patented Aug. 30, 1921.

Application filed July 23, 1920. Serial No. 398,598.

*To all whom it may concern:*

Be it known that I, WILLIAM F. MISEGADIS, a citizen of United States, and resident of Lorton, county of Otoe, State of Nebraska, have invented certain new and useful Improvements in Cisterns; and I do hereby declare that the following is a full, clear, and exact description of the invention, such as will enable others skilled in the art to which it appertains to make and use the same.

The present invention relates to improvements in storage buildings, having for its object to provide a cistern capable of successfully withstanding high winds or other stress which may be directed thereonto tending to cause weakening of the structure to such an extent as to permit the cracking of the walls thereof of the deterioration of said walls in any manner which will render the cistern leaky or unstable and consequently, unfit for use as a container for water.

It is also an object of the invention to provide a cistern which is so constructed as to maintain the water therein at a temperature above freezing and yet not permit such water to become warm or undesirable for drinking purposes should it be desired for this purpose.

Other objects will be in part obvious and in part pointed out hereinafer.

In order that the invention and the mode of its application may be readily understood by workers skilled in the art, I have in the accompanying illustrative drawings and in the detailed following description based thereon, set out one embodiment of the same.

In these drawings:—

Figure 1 is a vertical section through the improved cistern;

Fig. 2 is a top plan view thereof;

Fig. 3 is a fragmentary vertical section through the portion of the several walls of the structure;

Fig. 4 is a fragmentary horizontal section through the same, and,

Fig. 5 is a fragmentary section through the pit of the cistern, taken on the line 5—5 of the Fig. 1.

Having more particular reference to the drawings in connection with which like reference characters will designate corresponding parts throughout the several views, the cistern comprehends a base or foundation preferably formed of concrete or a similar material indicated at 1, said base being provided with a pit 2 whereby access may be had to the central portion thereof or that portion of the same through which the inlet and outlet conduits 3 and 4 respectively, extend, for an obvious purpose; steps 5 leading into the pit 2 from the surface of the base 1 of the cistern.

Upon the base 1 there is built an inner container 5, circular in cross section and having circular bracing wires 7 or cables embedded therein and arranged in superposed fashion whereby to lend to the rigidity of the walls, as clearly shown in the Fig. 3. These wires 7 may be arranged at any suitable distance apart such as will insure of proper bracing of the walls of the container 6. The upper portion of the container 7 is constricted or formed with an arch 8 of the same material as the walls thereof, an opening being left therein to allow access to the interior thereof for various purposes and being normally closed by means of a cover 9 of corresponding size and shape. The container 6 may be formed of brick, cement, tile or in fact, any material possessing the necessary rigidity and water retaining qualities.

As will be noted, the inner container 7 is arranged inwardly from the margin or peripheral edge of the annular base 1, thus affording space sufficient to permit of the building of a housing 10 thereabout and to allow of the spacing of said housing 10 therefrom in order that a dead air space will be provided about the inner container, affording an effective heat insulation therefor, whereby to maintain the water in the same at a point above freezing but yet prevent the same from reaching a temperature which would render it unfit for drinking or cooling purposes, should this be desired. The upper portion of the housing 10 is formed with an arch 10′ similar to the arch 8 of the inner container 6, and in the top thereof an opening is provided, which opening is in alinement with the opening of the arch 9 and is normally closed by means of a cover 15 corresponding thereto in size and shape. Also, the walls of the container 10 are provided with bracing wires 16 similar to the wires 7, but being arranged at greater distances apart, thus effectually bracing the same throughout. The walls of the housing 10 may be constructed of any suitable material offering the rigidity necessary to the practicability of the same, such for example as wood, concrete, brick, tile, etc.

To brace the inner container and the housing 7 and 10 with respect to each other for the purpose of adding to the stability of the cistern in its entirety, I may and preferably do employ crossed oblique truss wires or cables 11, connecting the opposite ends of the same to the adjacent portions of the walls of said containers by looping the same as at 12 and embedding the same therein or otherwise connecting the same thereto, such as conditions or preference may dictate. These truss wires 11, while serving to add to the rigidity of the cistern, will not permit the conducting of vibration from one container to the other, and in consequence, should the outer container be subjected to any stress such as would cause vibration of the same, the detrimental effect thereof will be confined to said outer container alone and will not in any way effect the stability of the inner container 6. The truss wires 11 may be arranged through the heights of the several containers, or if desired, may be confined to only the true perpendicular walls of the same.

To prevent excessive filling of the container 6, an overflow pipe 13 may be extended from the same at a suitable point thereon and obviously, will serve to conduct any excessive quantity of water therefrom.

To allow the flow of water into and out of the inner container to be controlled at will by a user of the improved cistern, valves indicated by the numeral 14 may be interposed in the inlet and outlet pipes 3 and 4, being located so as to permit their operating from within the pit 2 of the base 1.

A cistern constructed in accordance with my invention will be found to be of exceedingly rigid and stable character, since the outer wall or housing will afford an effective shield for the inner wall or container 6, receiving all stress to which the cistern may be subjected, as from wind storms or other detrimental elements. Vibration of the shield 10 will, as herein before stated, be prevented from being transmitted to the container 6, and therefore any liability of the cracking of such container of the breaking of portions therefore which would tend to render it unfit for further use, will be avoided, all of which will be found to materially add to the practicability of the device in general.

Manifestly, the construction shown is capable of considerable modification and such modification as is within the scope of my claims, I consider within the spirit of my invention.

Having thus fully described my invention what I claim as new and desire to secure by Letters Patent is:—

1. A cistern adapted to stand above the ground, comprising a base, a container arranged upon said base consisting of a brick wall, an outer wall completely housing said container and spaced therefrom forming an air space therebetween, flexible truss members arranged between said walls whereby the container will be protected from external pressures, and the outer ends of said truss members being embedded within the adjacent faces of said walls substantially as and for the purpose specified.

2. A cistern of the character described comprising a base, a container arranged upon said base, an outer wall completely housing said container, forming an air space therebetween, diagonal truss wires extending in zigzag relation across said air space, and said truss wires forming a flexible connection for said container and said outer wall.

3. A cistern comprising a base, a container consisting of a circular brick wall and an arched top, an outer wall completely housing said circular wall and arched top of the container, said outer wall being spaced from said container to form an air space completely around the circular brick wall and the arched top of the container, and flexible truss connections between said outer wall and circular wall of the container whereby the circular brick wall will be protected from external pressures transmitted to the outer wall substantially as and for the purpose specified.

4. A cistern of the character described comprising a circular base, a pit arranged below said base, a container arranged upon said base, said container consisting of a circular brick wall, and an arched top, a housing for said container comprising a circular brick wall and an arched top, said container and housing being spaced apart to form an air space therebetween, horizontally arranged truss wires extending across said air space and having their opposite ends embedded within said circular brick walls, and alining closure-controlled openings formed within said arched top substantially as and for the purpose specified.

In witness whereof I have hereunto set my hand.

WILLIAM F. MISEGADIS.